US005774834A

United States Patent [19]
Visser

[11] Patent Number: 5,774,834
[45] Date of Patent: Jun. 30, 1998

[54] SYSTEM AND METHOD FOR CORRECTING A STRING OF CHARACTERS BY SKIPPING TO PSEUDO-SYLLABLE BORDERS IN A DICTIONARY

[75] Inventor: Eric M. Visser, Kawasaki, Japan

[73] Assignee: Fujitsu Limited, Kawasaki, Japan

[21] Appl. No.: 521,725

[22] Filed: Aug. 31, 1995

[30] Foreign Application Priority Data

Sep. 1, 1994 [JP] Japan .................................... 6-208307

[51] Int. Cl.⁶ ..................................................... G06F 17/20
[52] U.S. Cl. ................................ 704/10; 704/9; 707/532; 707/533
[58] Field of Search .................................... 395/760, 794, 395/795, 793, 759; 704/10, 9, 1; 707/532, 533, 531

[56] References Cited

U.S. PATENT DOCUMENTS

| | | | |
|---|---|---|---|
| 4,490,811 | 12/1984 | Yianilos et al. | 364/567 |
| 4,777,617 | 10/1988 | Frisch et al. | 395/759 |
| 4,864,501 | 9/1989 | Kucera et al. | 395/759 |
| 4,873,634 | 10/1989 | Frisch et al. | 395/795 |
| 5,113,340 | 5/1992 | McWherter | 395/795 |
| 5,323,316 | 6/1994 | Kadashevich et al. | 395/759 |

*Primary Examiner*—David R. Hudspeth
*Assistant Examiner*—Joseph Thomas
*Attorney, Agent, or Firm*—Staas & Halsey

[57] ABSTRACT

A retrieving unit retrieves an entry of a dictionary which corresponds to an input character string while comparing input characters, one by one, with entries of TRIE tables stored in a dictionary storing unit. When a character of the input character string does not coincide with any of the entries in the currently-used TRIE table, a skipping unit locates a next effective pseudo-syllable border in the input character string to find candidates of those TRIE tables which correspond to the effective pseudo-syllable border. The retrieving unit retrieves a character string consisting of those characters which follow the pseudo-syllable border thus located, while using the candidates of these TRIE tables, and retrieves an entry in the dictionary which corresponds to the input character string to thereby output it as a recognized word.

12 Claims, 20 Drawing Sheets

TRIE TABLE "ROOT"

| INPUT CHARACTER | CORRESPONDING DICTIONARY WORD | TRIE TABLE LINK |
|---|---|---|
| a | Art | a — |
| b | φ | b — |
| c | φ | c — |
| ⋮ | ⋮ | ⋮ |
| i | Pron | i — |
| ⋮ | ⋮ | ⋮ |
| r | φ | r — |
| ⋮ | ⋮ | ⋮ |
| x | φ | x — |
| y | φ | y — |
| z | φ | z — |

PRIOR ART

F I G. 1

TRIE TABLE "R-"

| INPUT CHARACTER | CORRESPONDING DICTIONARY WORD | TRIE TABLE LINK |
|---|---|---|
| a | N, Prop.N | ra- |
| b | N | rb- |
| d | ϕ | rd- |
| e | Prep | re- |
| h | ϕ | rh- |
| i | ϕ | ri- |
| o | ϕ | ro- |
| r | ϕ | rr- |
| u | ϕ | ru- |
| y | ϕ | ry- |

FIG. 2A

TRIE TABLE "RD-"

| INPUT CHARACTER | CORRESPONDING DICTIONARY WORD | TRIE TABLE LINK |
|---|---|---|
|  | N | rd.- |

FIG. 2B

TRIE TABLE "RD.-"

| INPUT CHARACTER | CORRESPONDING DICTIONARY WORD | TRIE TABLE LINK |
|---|---|---|

FIG. 2C

PRIOR ART

TRIE TABLE "REPR-"

| INPUT CHARACTER | CORRESPONDING DICTIONARY WORD | TRIE TABLE LINK |
|---|---|---|
| e | φ | repre- |
| i | φ | repri- |
| o | φ | repro- |
| PSEUDO-SYLLABLE BORDER | : repreh-, repres-, repress-, repriev-, reprim-, ····· | |

FIG. 11A

TRIE TABLE "REPRE-"

| INPUT CHARACTER | CORRESPONDING DICTIONARY WORD | TRIE TABLE LINK |
|---|---|---|
| h | φ | repreh- |
| s | φ | repres- |
| PSEUDO-SYLLABLE BORDER | : repreh-, repres-, repress- | |

FIG. 11B

TRIE TABLE "REPREH-"

| INPUT CHARACTER | CORRESPONDING DICTIONARY WORD | TRIE TABLE LINK |
|---|---|---|
| e | φ | reprehe- |
| PSEUDO-SYLLABLE BORDER | : reprehend-, reprehens- | |

FIG. 11C

TRIE TABLE "REPRES-"

| INPUT CHARACTER | CORRESPONDING CHARACTER WORD | TRIE TABLE LINK |
|---|---|---|
| e | φ | represe- |
| s | V | repress- |
| PSEUDO-SYLLABLE BORDER | : represent-, repress- | |

FIG. 11D

TRIE TABLE "REPREHENS-"

| INPUT CHARACTER | CORRESPONDING DICTIONARY WORD | TRIE TABLE LINK |
|---|---|---|
| i | φ | reprehensi- |
| PSEUDO-SYLLABLE BORDER | : reprehensibl-, reprehension- | |

FIG. 12A

TRIE TABLE "REPREHEND-"

| INPUT CHARACTER | CORRESPONDING DICTIONARY WORD | TRIE TABLE LINK |
|---|---|---|

FIG. 12B

TRIE TABLE "REPRESS-"

| INPUT CHARACTER | CORRESPONDING DICTIONARY WORD | TRIE TABLE LINK |
|---|---|---|
| i | φ | repressi- |
| PSEUDO-SYLLABLE BORDER | : repressibl-, repression-, repressiv- | |

FIG. 12C

TRIE TABLE "REPRESENT"

| INPUT CHARACTER | CORRESPONDING DICTIONARY WORD | TRIE TABLE LINK |
|---|---|---|
| a | φ | representa- |
| PSEUDO-SYLLABLE BORDER | : representat- | |

FIG. 12D

TRIE TABLE "FA-"

| INPUT CHARACTER | CORRESPONDING DICTIONARY WORD | TRIE TABLE LINK |
|---|---|---|
| b | φ | f a b - |
| c | φ | f a c - |
| d | N | f a d - |
| ⋮ | ⋮ | ⋮ |
| r | Adj, Adv | f a r - |
| s | φ | f a s - |
| t | N, Adj, V | f a t - |
| ⋮ | ⋮ | ⋮ |
| PSEUDO-SYLLABLE BORDER : fab-, fabl-, fabr-, fac-, fact-, fad-, fadd-, ..... |||

FIG. 13A

TRIE TABLE "FAS-"

| INPUT CHARACTER | CORRESPONDING DICTIONARY WORD | TRIE TABLE LINK |
|---|---|---|
| c | φ | f a s c - |
| h | V | f a s h - |
| t | Adj, Adv, V, N | f a s t - |
| PSEUDO-SYLLABLE BORDER : fasc-, fash-, fast-, fastn-, |||

FIG. 13B

TRIE TABLE "FASC"

| INPUT CHARACTER | CORRESPONDING DICTIONARY WORD | TRIE TABLE LINK |
|---|---|---|
| e | φ | f a s c e - |
| i | φ | f a s c i - |
| PSEUDO-SYLLABLE BORDER : fasces-, fasciat-, fascic-, fascicl-, fascin-, fascism-, fascist- |||

FIG. 13C

TRIE TABLE "FASCES-"

| INPUT CHARACTER | CORRESPONDING DICTIONARY WORD | TRIE TABLE LINK |
|---|---|---|

FIG. 14A

TRIE TABLE "FASCIAT-"

| INPUT CHARACTER | CORRESPONDING DICTIONARY WORD | TRIE TABLE LINK |
|---|---|---|
| e | φ | fasciate- |
| i | φ | fasciati- |
| PSEUDO-SYLLABLE BORDER | : fasciated-, fasciation- | |

FIG. 14B

TRIE TABLE "FASCIC-"

| INPUT CHARACTER | CORRESPONDING DICTIONARY WORD | TRIE TABLE LINK |
|---|---|---|
| l | φ | fascicl- |
| u | φ | fascicu- |
| PSEUDO-SYLLABLE BORDER | : fascicl-, fascicul- | |

FIG. 14C

TRIE TABLE "FASCICL-"

| INPUT CHARACTER | CORRESPONDING DICTIONARY WORD | TRIE TABLE LINK |
|---|---|---|
| e | φ | fascicle- |
| PSEUDO-SYLLABLE BORDER | : fascicle- | |

FIG. 14D

TRIE TABLE "FASCIN-"

| INPUT CHARACTER | CORRESPONDING DICTIONARY WORD | TRIE TABLE LINK |
|---|---|---|
| a | φ | fascina- |
| e | N | fascine- |
| PSEUDO-SYLLABLE BORDER | : fascinat- | |

FIG. 14E

TRIE TABLE "FASCISM-"

| INPUT CHARACTER | CORRESPONDING DICTIONARY WORD | TRIE TABLE LINK |
|---|---|---|

FIG. 15A

TRIE TABLE "FASCIST-"

| INPUT CHARACTER | CORRESPONDING DICTIONARY WORD | TRIE TABLE LINK |
|---|---|---|
| i | ϕ | fascisti- |
| PSEUDO-SYLLABLE BORDER | : fascistiz- | |

FIG. 15B

TRIE TABLE "FASCINA-"

| INPUT CHARACTER | CORRESPONDING DICTIONARY WORD | TRIE TABLE LINK |
|---|---|---|
| t | ϕ | fascinat- |
| PSEUDO-SYLLABLE BORDER | : fascinat- | |

FIG. 15C

TRIE TABLE "FASH-"

| INPUT CHARACTER | CORRESPONDING DICTIONARY WORD | TRIE TABLE LINK |
|---|---|---|
| i | ϕ | fashi- |
| PSEUDO-SYLLABLE BORDER | : fashion- | |

FIG. 15D

TRIE TABLE "FASHION-"

| INPUT CHARACTER | CORRESPONDING DICTIONARY WORD | TRIE TABLE LINK |
|---|---|---|
| a | ϕ | fashiona- |
| e | ϕ | fashione- |
| PSEUDO-SYLLABLE BORDER | : fashionable-, fashioned- | |

FIG. 15E

TRIE TABLE "FAST-"

| INPUT CHARACTER | CORRESPONDING DICTIONARY WORD | TRIE TABLE LINK |
|---|---|---|
| e | φ | |
| i | φ | |
| PSEUDO-SYLLABLE BORDOR | : fasten-, fastid-, fasting-, fastish-, fastn- | |

F I G. 16 A

TRIE TABLE "FASTEN-"

| INPUT CHARACTER | CORRESPONDING DICTIONARY WORD | TRIE TABLE LINK |
|---|---|---|
| a | φ | fastena- |
| e | φ | fastene- |
| i | φ | fasteni- |
| PSEUDO-SYLLABLE BORDOR | : fastenabl-, fastener-, fastening- | |

F I G. 16 B

TRIE TABLE "FASTID-"

| INPUT CHARACTER | CORRESPONDING DICTIONARY WORD | TRIE TABLE LINK |
|---|---|---|
| i | φ | fastidi- |
| PSEUDO-SYLLABLE BORDOR | : fastidious- | |

F I G. 16 C

TRIE TABLE "FASTING-"

| INPUT CHARACTER | CORRESPONDING DICTIONARY WORD | TRIE TABLE LINK |
|---|---|---|

F I G. 16 D

TRIE TABLE "FASTISH-"

| INPUT CHARACTER | CORRESPONDING DICTIONARY WORD | TRIE TABLE LINK |
|---|---|---|

F I G. 16 E

TRIE TABLE "FASTN-"

| INPUT CHARACTER | CORRESPONDING DICTIONARY WORD | TRIE TABLE LINK |
|---|---|---|
| e | φ | |
| PSEUDO-SYLLABLE BORDER | : fastness- | |

FIG. 17A

TRIE TABLE "FASTNESS-"

| INPUT CHARACTER | CORRESPONDING DICTIONARY WORD | TRIE TABLE LINK |
|---|---|---|

FIG. 17B

TRIE TABLE "FASHIONA-"

| INPUT CHARACTER | CORRESPONDING DICTIONARY WORD | TRIE TABLE LINK |
|---|---|---|
| b | φ | fashionab- |
| PSEUDO-SYLLABLE BORDER | : fashionabl- | |

FIG. 17C

TRIE TABLE "FASTENA-"

| INPUT CHARACTER | CORRESPONDING DICTIONARY WORD | TRIE TABLE LINK |
|---|---|---|
| b | φ | fastenab- |
| PSEUDO-SYLLABLE BORDER | : fastenabl- | |

FIG. 17D

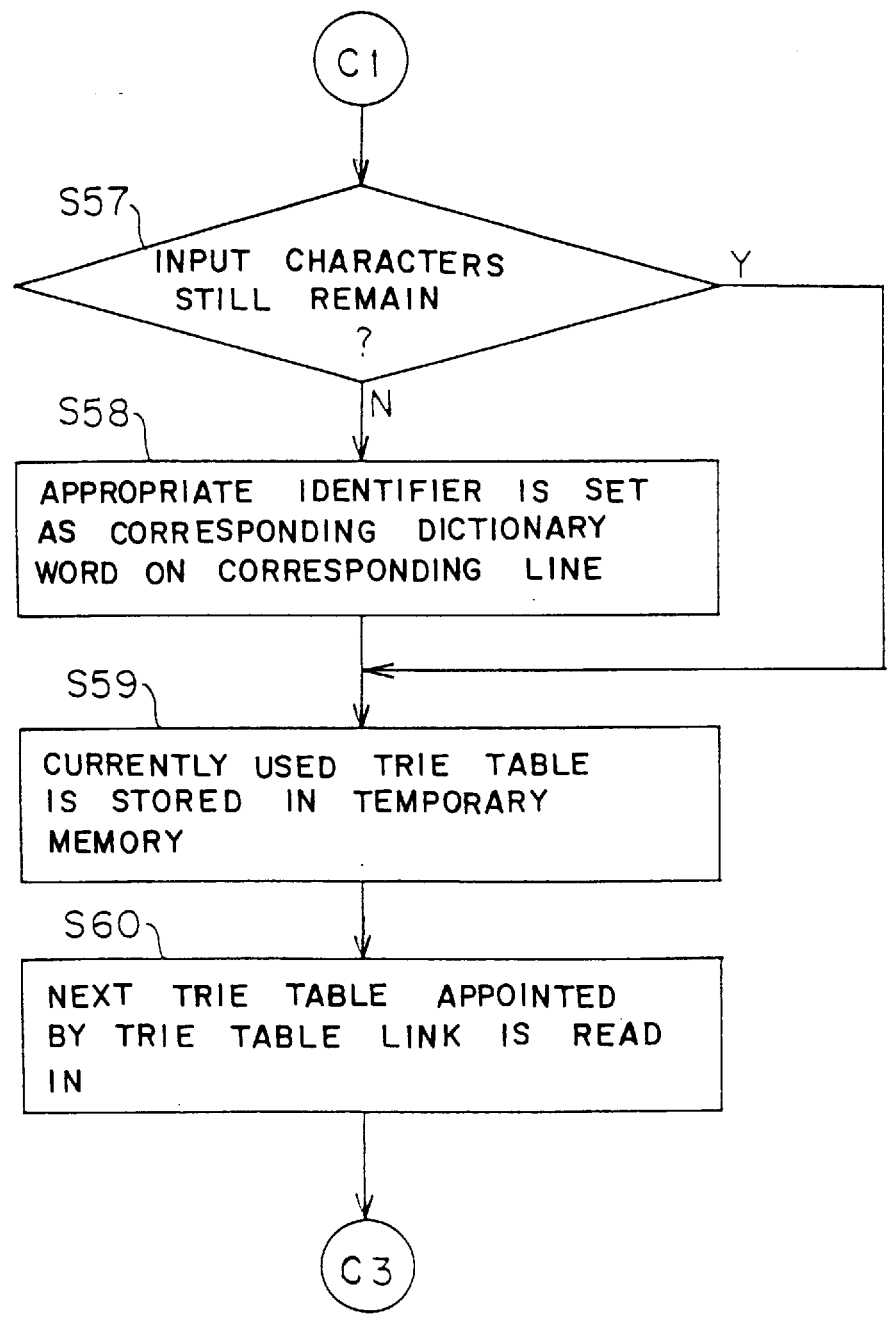
F I G. 19

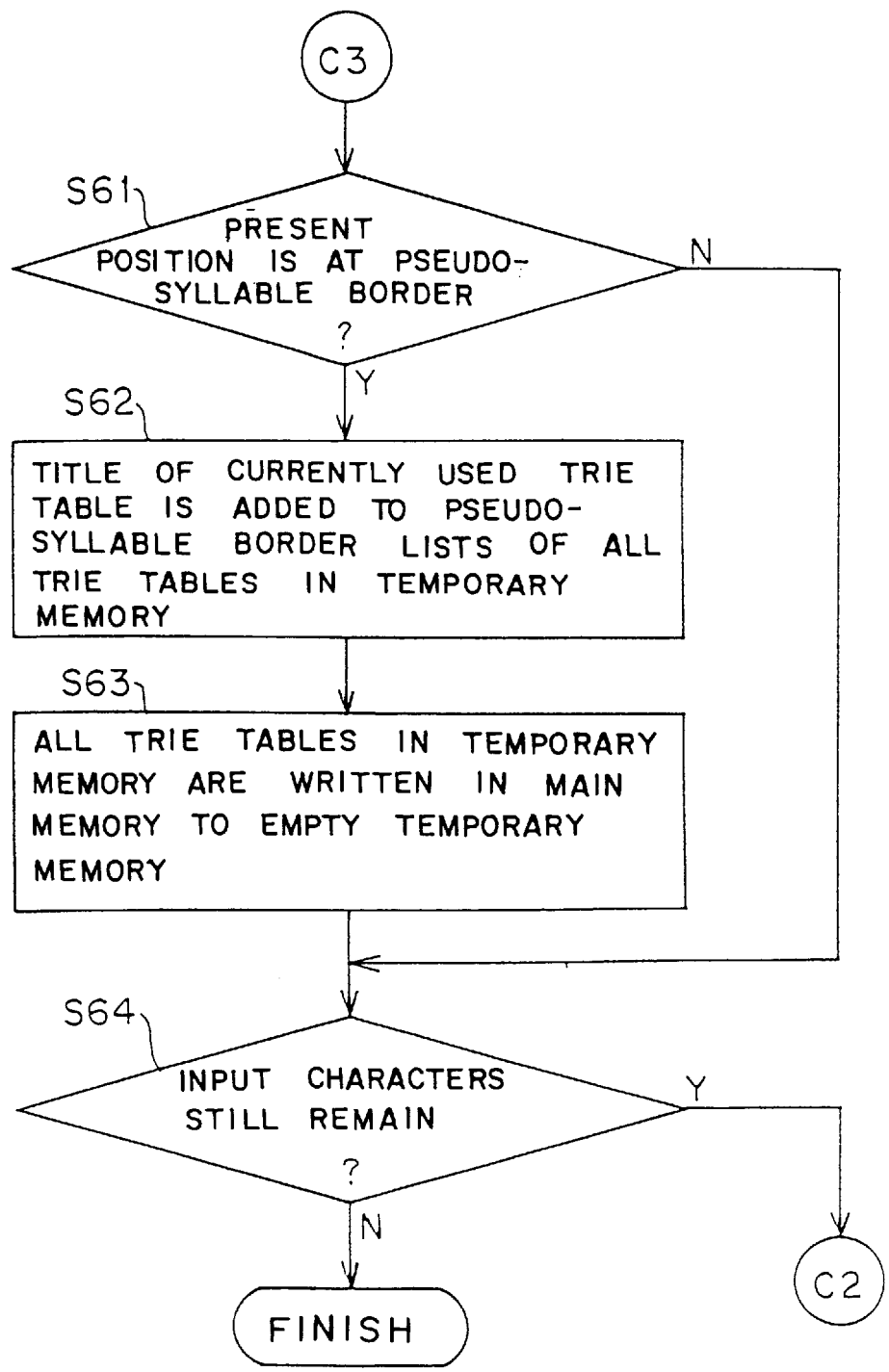
F I G. 20

SYSTEM AND METHOD FOR CORRECTING A STRING OF CHARACTERS BY SKIPPING TO PSEUDO-SYLLABLE BORDERS IN A DICTIONARY

BACKGROUND OF THE INVENTION

1. Field of the Invention

The present invention relates to a document processing system and, more particularly, a system and method for determining a correct character string when the character string (including symbols and the like) of an input document has errors.

2. Description of the Related Art

Morphological analysis which is designed to divide an input sentence into words is the most basic step in document processing (or natural language processing), and it has become a problem to be studied these days. In conventional morphological analysis, dictionary retrieval is the main target. In European language sentence processing, for example, the processor receives, as words, those parts of a sentence which are punctuated by spaces and punctuation marks, and seeks only words in a dictionary which correspond to these received words. Spelling errors are also corrected by the rule of approximation and the like in this case.

As seen in common sentences, however, spaces and punctuation marks are sometimes put in wrong positions in the sentences, or they may be missed out altogether. Further, words are not punctuated by spaces in languages such as Chinese and Japanese. Furthermore, German and Dutch have greater freedom for making new words, because new words can be created by combining dictionary words with one another. This means that spaces and punctuation marks cannot accurately serve as borders between which a correct word is created.

In another type of morphological analysis, characters of an input sentence are read one by one, concatenated into strings and these strings compared with words in the dictionary. According to this method, any input character strings in which symbols and the like are included can be processed from the start, without taking borders of words into consideration. When a character string which has been read to a certain position in an input character string corresponds to a word in the dictionary, but it does not coincide with any of words in the dictionary if one or more of the remaining characters of the input character string are added to it, it is then determined that this position shows the end of a word.

Various methods can be conceived, the simplest one being to store the whole of a dictionary in a memory and to successively cancel those words which do not coincide with an input word.

However, the most widely used method is to compile words in the dictionary as a plurality of tables which are called TRIE tables, and to set reference relationship among them. One of these TRIE tables has the first characters of all words in the dictionary. An entry of a character "a" in this table appoints another table which has the second character of all words whose first character is "a". This well-known method is called the TRIE method (see Donald E. Knuth. The Art of Computer Programming. Volume 3: Storing and Searching. Addison-Wesley Series in Computer Science and Information Processing. Addison-Wesley Company, Reading (Mass.), 1973).

FIGS. 1 through 2C show TRIE tables and their relationships according to the conventional TRIE method. In these TRIE tables, each input character in a first column represents a character entry in that the TRIE table, which corresponds to a specific position in a word. The TRIE tables shown in FIGS. 1 and 2A store only letters of alphabets as input characters. However, as can be seen in table 2B, input characters are not necessarily limited just to these, and numerals, punctuation marks or spaces can be used as input characters. The TRIE table "root" shown in FIG. 1 is the highest ranking one in which the first characters of all words are stored as input characters.

Each corresponding word of the dictionary in the second column shows whether or not a character string which has been read in till then corresponds to any of the entries in of the dictionary. When a character string corresponds to an entry in the dictionary, the part of speech of the entry is stored as a corresponding word of the dictionary, as shown in FIGS. 1 through 2C. "Art", "Pron", "N", "Prop. N", and "Prep", for example, represent articles, pronouns, common nouns, proper nouns and prepositions, respectively. When no entry is found in the dictionary, a symbol "100" which denotes an empty set is stored.

Two entries in the dictionary, that is, the chemical symbol "ra" (N) of radium and the name "ra" (Prop. N) of an Egyptian God, correspond to an input character "a" of the TRIE table "r-" shown in FIG. 2A.

Each TRIE table link shown in the third column represents the title of a TRIE table which corresponds to a position reached after an input character in the first column is processed, and it shows how the TRIE table is related to those following it. For example, a TRIE table link "r-" in the TRIE table "root" shown in FIG. 1, appoints the TRIE table "r-", a TRIE table link "rd-" in the TRIE table "r-" appoints the TRIE table "rd-" shown in FIG. 2B, and a TRIE table link "rd.-" in the TRIE table "rd-" appoints the TRIE table "rd.-" shown in FIG. 2C.

FIG. 3 is a flow chart showing a fundamental process according to the TRIE method. The fundamental process will be described citing a character string "Rd." as an example, and referring to FIG. 3.

When the process is started, the TRIE table "root" is read in first (step S1), and a first character "R" of the input character string is then read in (step S2). It is determined whether or not the read-in character is found in the entries of input characters in the TRIE table "root" (step S3). The character "R" ("r") can be found in the TRIE table "root". The TRIE table "r-" appointed by the TRIE table link which corresponds to the character "R" is thus read in (step S7).

The next character "d" of the remaining character string is then read in (step S2), and the TRIE table "rd-" appointed by the TRIE table link which corresponds to the characters "rd" in the TRIE table "r-", is read in (step S7). Further, a character "." . is read in (step S2), and the TRIE table "rd.-", appointed by the TRIE table link which corresponds to the characters "rd." in the TRIE table "rd-", is read in (step S7).

A space " " is read in next (step S2), but the TRIE table "rd.-" is empty and has no corresponding entry. It is therefore determined whether or not the character string "rd.", which has been read in up to the space, is found in the entries in the dictionary (step S4). The character string "rd." is an abbreviation of "Road", and it is registered in the dictionary. It can be thus recognized as a word (step S8), and the process is finished.

The reason why the TRIE table "rd.-" has no entry is because there is no word having characters after the character string "rd." registered in the dictionary.

When no entry is found in the dictionary at the step S4, characters of the read-in character string are canceled one by one from the last character thereof (step S5), and when a character string thus left coincides with an entry of the dictionary (step S6, YES), it can be recognized as a word (step S8).

When words "catch" and "catch 22" are registered as entries in the dictionary, an entry in the input character of a TRIE table "catch-" has a space " " When the character string "catch the dog" is inputted, therefore, it is successively read in up to the character "t" of "the" (step S2). However, the character "t" is not found in entries of the TRIE table "catch-" (step S3, NO), and the character string "catch " is not found in entries in the dictionary either (step S4, NO). Therefore, the last character " " of "catch" is canceled (step S5), and the character string "catch" can be recognized as a word (step S8).

The mechanism for dealing with spelling errors in this system is usually triggered when an input character does not coincide with any of the entries in the TRIE table. The simplest measure in this case is to seek another character in the TRIE table which can be substituted for the input character, providing that the input character is an error. Another possible measure is to employ the next input character instead, providing that the input character is unnecessary for the currently retrieving character string, or to assume that a character has been left out of the input character string.

A plurality of measures can be therefore used to correct spelling errors but, generally speaking, wrong substitute candidates are canceled as the process advances.

FIGS. 4 and 5 are flow charts showing a spelling error correcting process according to the conventional TRIE method. In FIGS. 4 and 5, steps S11 through S16 and S18, S19 and S22 are the same as in the fundamental process shown in FIG. 3. However, steps S13 and S14 are different from this process in that they target a plurality of TRIE tables. This is because access must be gained to a plurality of TRIE tables for characters of an input character string, following a spelling error character thereof.

When it is determined at the step S14 shown in FIG. 4, that a character string is not found in the entries in the dictionary, it is determined at the step S17 shown in FIG. 5 whether or not the last readin character of the character string is a spelling error. Providing that it is a spelling error, one or more characters are selected instead from the currently-used TRIE table (step S20), and one or more TRIE tables which follow the currently-used one, and which correspond to these characters, are read in (step S21). Steps following the step S12 are then repeated, thereby retrieving a correct entry from the dictionary.

However, the above-described conventional spelling error correcting methods can only deal with a character string which has a relatively small error, such as one wrong character therein. In the case of a character string which has a larger error, such as 2, 3 or more consecutive wrong characters therein, the number of possible substitute characters becomes enormous, and the process becomes so slow as to be unacceptable.

SUMMARY OF THE INVENTION

The present invention is therefore intended to correct an input character string and recognize it as a correct word or words, when the input character string in which symbols and others are included has a plurality of consecutive wrong characters, or a serious error of an unexpected type therein.

A character string correcting system according to the present invention has a dictionary storing unit for storing a dictionary having entries for comparison with characters of an input character string, a retrieving unit for retrieving the dictionary stored in the dictionary storing unit to retrieve an entry of the dictionary which corresponds to the input character string and output it as a recognized word which results from the retrieval, and a skipping unit for skipping a part of the input character string as well as a part of the dictionary, to locate a position in the input character string where a next character of the input character string coincides with an entry of the dictionary, and to cause the retrieving unit to start its retrieval from this position, when one character of the input character string does not coincide with any of the other entries of input characters.

A character string correcting method according to the present invention has the steps of creating a dictionary having entries for comparison with characters of an input character string, retrieving the created dictionary to retrieve an entry which corresponds to a character of the input character string, skipping a part of the dictionary as well as a part of input character string to locate a position in the input character string where a next character of the input character string coincides with an entry of the dictionary, when one character of the input character string does not coincide with any of the other entries of input characters, starting the retrieval from this position to retrieve an entry in the dictionary which corresponds to the input character string, and outputting the entry from the dictionary as a recognized word which results from the retrieval.

According to the character string correcting system or method of the present invention, characters of a character string (or input character string) in a document are successively read in order first, and it is detected whether or not a character string in the document which comprises characters read till then can be found in character strings (or entries for input character strings) in the dictionary. When the character string in the document includes a spelling error or errors, it is skipped from the last character which can be found in the entries in the dictionary, to a specific character, which is determined by a predetermined rule. On the other hand, candidates for a character string corresponding to that in the document which comprises characters continuous from the first character to the specific one in the input character string, are selected from entries of the dictionary. They are used as character strings having no spelling errors, instead of the character string in the document which has the spelling errors. When skipping is made up to the specific character of the input character string, the character next to the specific one of the input character string is read, and character strings which can be connected to the currently-read-in character are selected from the candidates of the character strings selected at the time of skipping. When the input character string is read to the last character, one of the selected candidates or character strings which remains suitable to the last character is outputted as a substitute character string (or recognized word) instead of the input character string in the document having the spelling errors.

It is unnecessary to process those characters of a character string, one by one, which correspond to spelling errors, as seen in conventional methods. The correcting of errors in a character string can thus be made easier and at a higher speed.

BRIEF DESCRIPTION OF THE DRAWINGS

FIG. 1 shows a structure of the conventional TRIE table "root";

FIG. 2A, 2B and 2C show conventional TRIE tables and their connecting relationships;

FIGS. 11A through 11D and 12A through 12D show structures of TRIE tables in the embodiment of the present invention, for describing cases where "repretentative of" and "repretantative of" are inputted as input character strings;

FIGS. 13A through 13C, 14A through 14E, 15A through 15E, 16A through 16E, and 17A through 17D show structures of TRIE tables in the embodiment of the present invention, for describing a case where "fasjoonable" is inputted as an input character string; and FIGS. 18, 19 and 20 are flow charts showing a dictionary compiling process.

DETAILED DESCRIPTION OF THE PREFERRED EMBODIMENT

Figure 6:
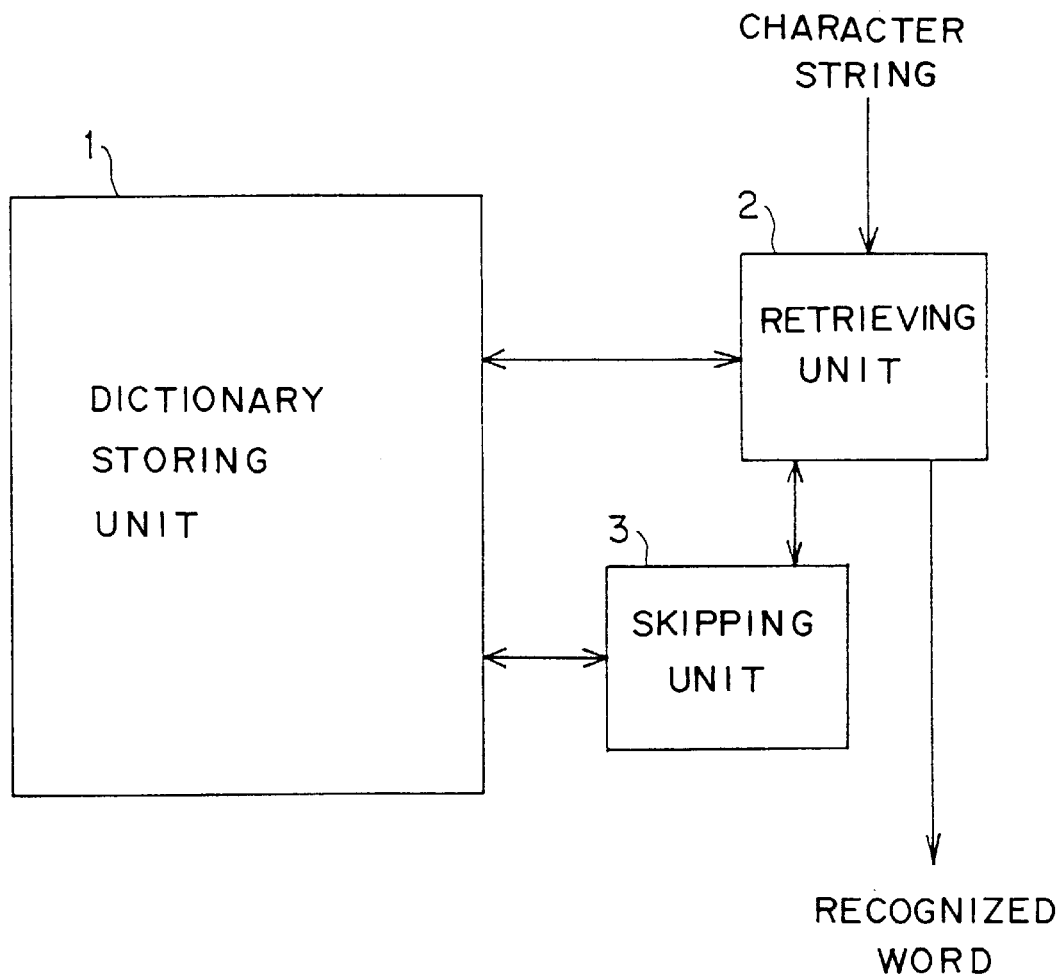
FIG. 6 is a block diagram showing a principle of the present invention.

The present invention relates to a system and method for correcting a string of error-included characters to a string of error-corrected characters. FIG. 6 is a block diagram showing the principle of a character string correcting system according to the present invention.

The character string correcting system according to the present invention is most suitable for use with the information process apparatus in which morphological analysis is conducted while comparing a character string inputted with entries in a dictionary. This system includes a dictionary storing unit 1, a retrieving unit 2 and a skipping unit 3.

The dictionary storing unit 1 stores a dictionary having entries which are compared with characters of a character string inputted.

The retrieving unit 2 retrieves the dictionary in the dictionary storing unit 1 to obtain an entry in the dictionary which corresponds to the character string inputted, and outputs it as a recognized word resulting from the retrieval.

The skipping unit 3 locates a position at which a character of the character string inputted coincides with an entry in the dictionary, while skipping a part of the character string and also a part of the dictionary, when a character does not coincide with any entry in the dictionary, thereby enabling the retrieving unit 2 to start its retrieval again from the position thus located.

Figure 7:
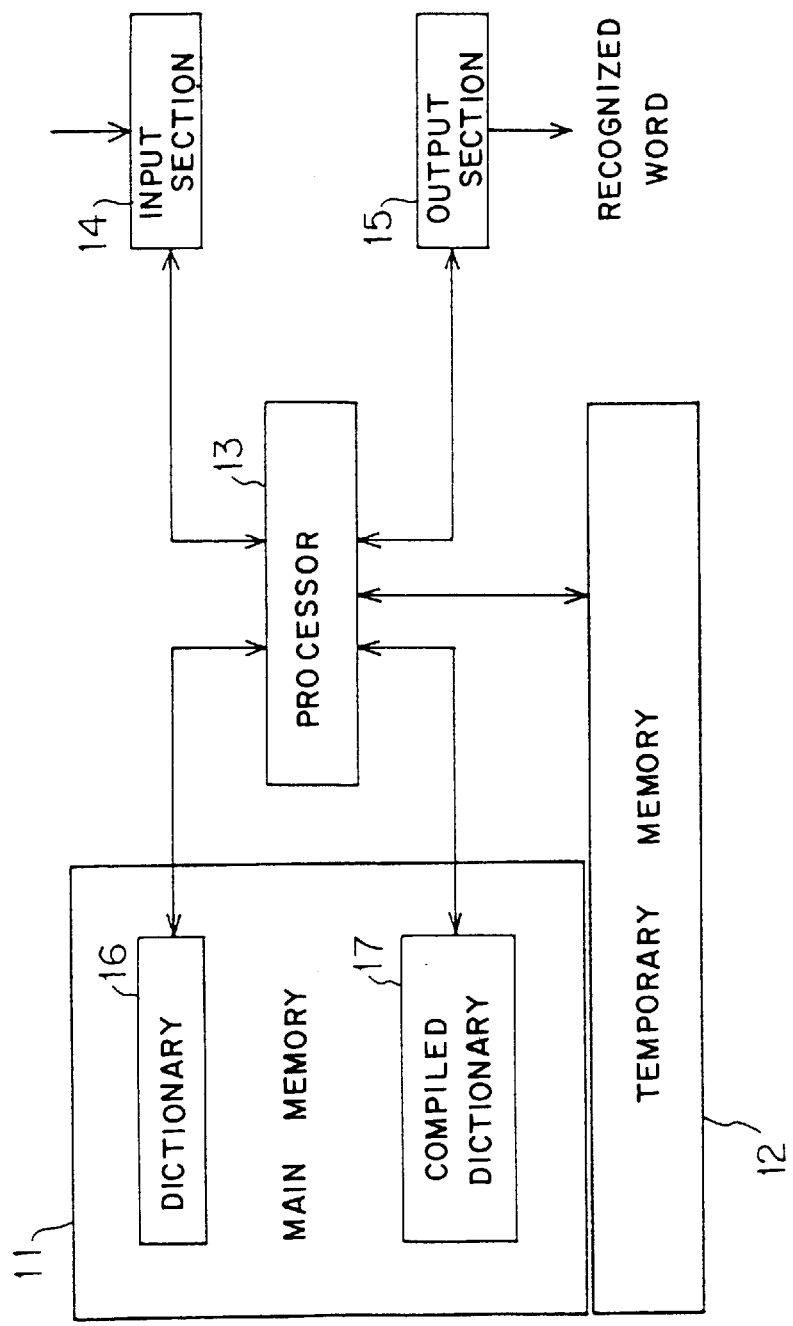
FIG. 7 is a block diagram showing an embodiment of the present invention.

The dictionary storing unit 1 in FIG. 6 corresponds to a main memory 11 in a block diagram in FIG.7, which shows an embodiment of the present invention. The retrieving and skipping units 2 and 3 correspond to a processor 13 in FIG. 7. The dictionary stored in the dictionary storing unit 1 corresponds to a compiled dictionary 17, and it includes TRIE tables which are grouped as kinds of retrieving tables, for example.

The dictionary storing unit 1 stores a type of dictionary that enables characters of a character string inputted to be compared one by one with entries in the dictionary, as seen in the case of TRIE tables. The retrieval process conducted by the retrieving unit 2, when a character string is inputted, can be thus made easier.

When usual retrieval cannot advance because a part of the character string inputted has an error, the skipping unit 3 locates a position in the character string that enables usual retrieval to be conducted again, while skipping a part of the dictionary as well as the part of the character string.

The retrieving unit 2 can start its retrieval again from the position thus located by the skipping unit 3, to thereby obtain a recognized word which corresponds to the character string inputted.

Even when a character string inputted includes such a serious error as a plurality of consecutive wrong characters, it can be more easily corrected because the wrong-characters-part of the character string can be skipped, and because those entries in the dictionary which correspond to characters following the position in the character string thus located can be used.

Further, a character string including a plurality of wrong characters can be processed at a higher speed because it is not needed to determine whether or not each of these wrong characters can be replaced by another character.

FIG. 7 is a block diagram showing a structure of the character string correcting system according to an embodiment of the present invention. This system includes the main memory 11, a temporary memory 12, the processor 13, an input section 14, and an output section 15.

The processor 13 compiles a dictionary 16, stored in the main memory by the temporary memory 12, to create a new TRIE table and stores it, as the compiled dictionary 17, in the main memory 11. Further, the processor 13 reads characters of a character string (or input character string) in the order in which it is inputted in the input section 14, retrieves the compiled dictionary 17, and sends to the output section 15 a word or words which correspond to the character string. The output section 15 outputs the word or words, as a recognized word or words, to a display, a printer, or to a next process device of the document processing system, for example.

Figure 8:
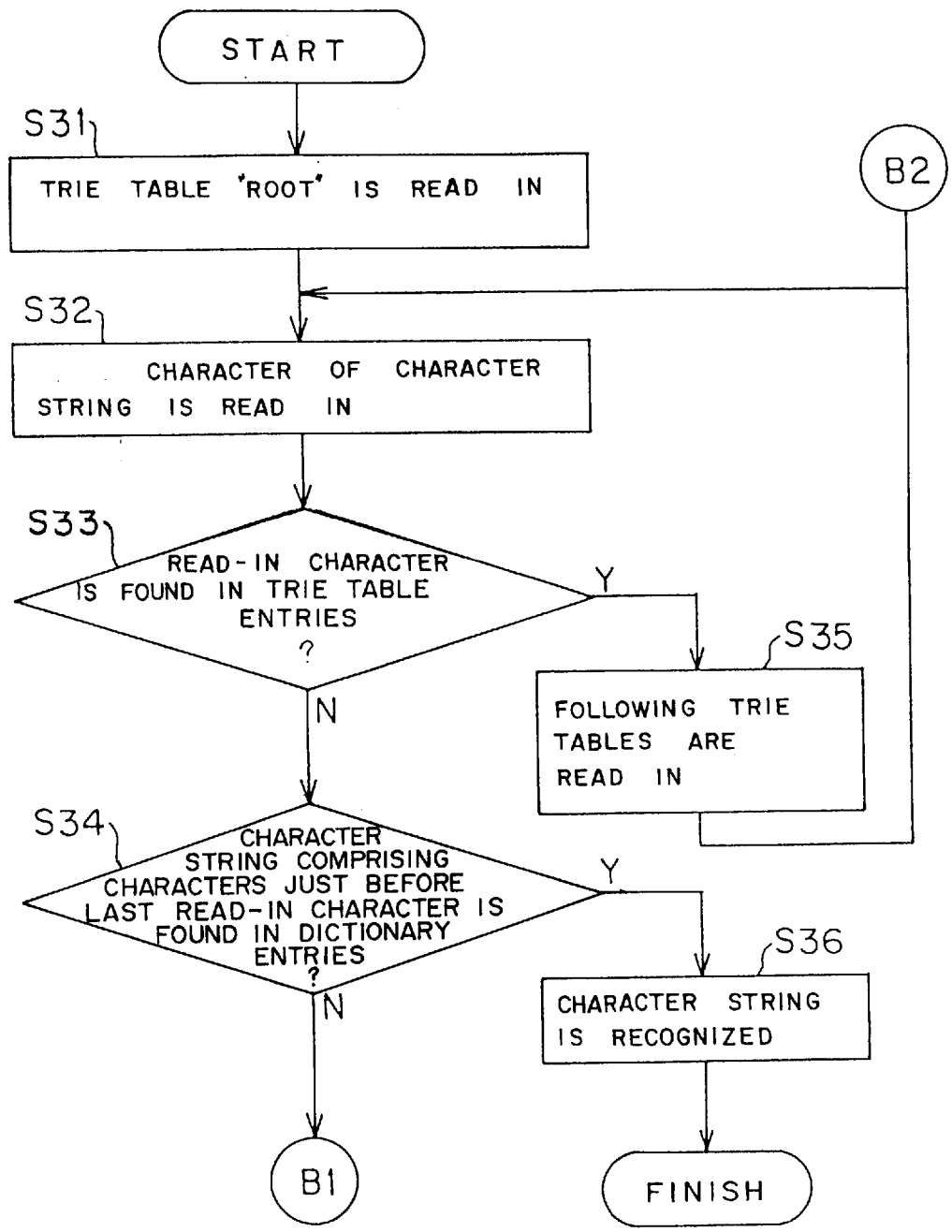
FIGS. 8, 9 and 10 are flow charts showing a spelling error correcting process in the embodiment of the present invention.
Figure 9:
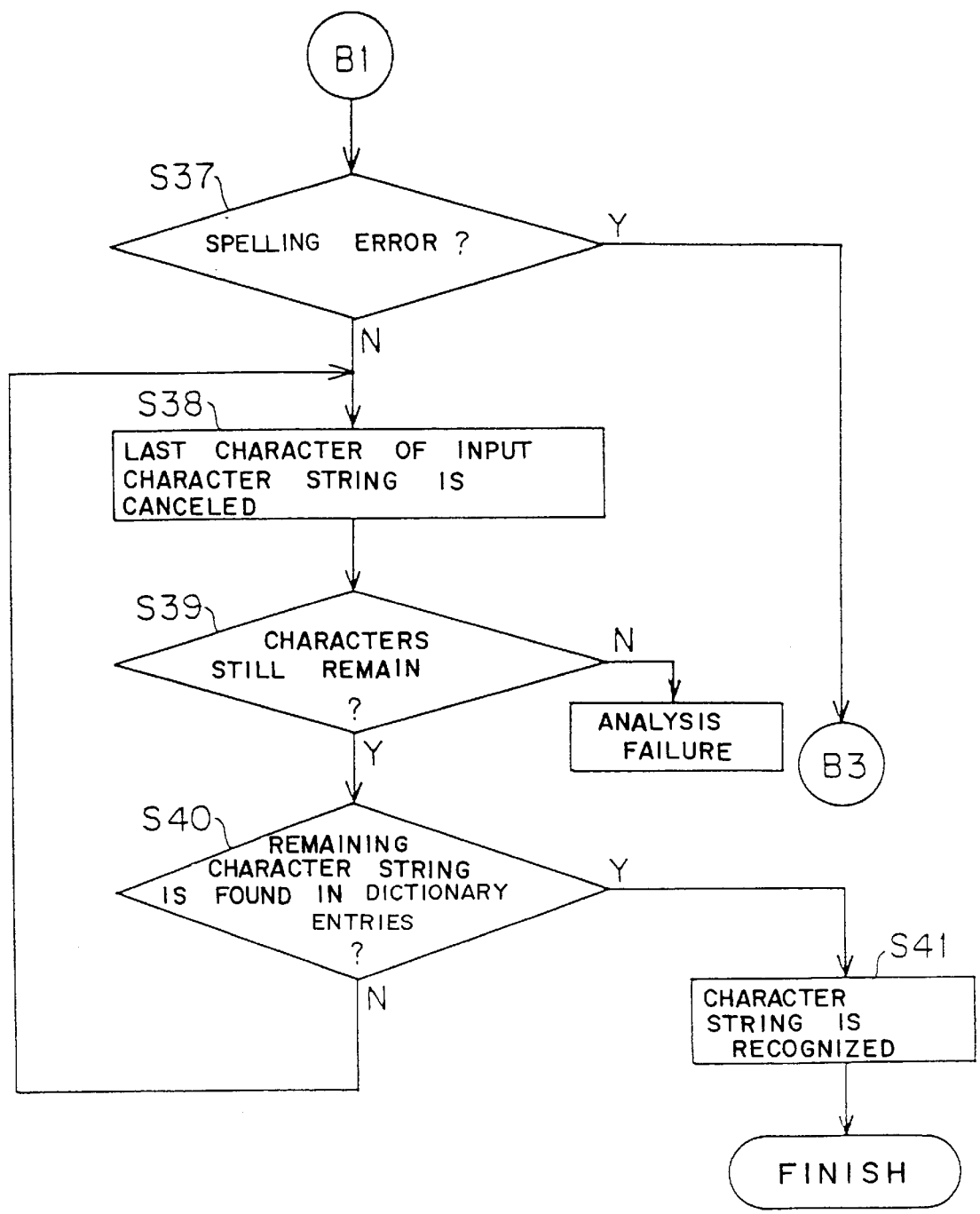
Figure 10:
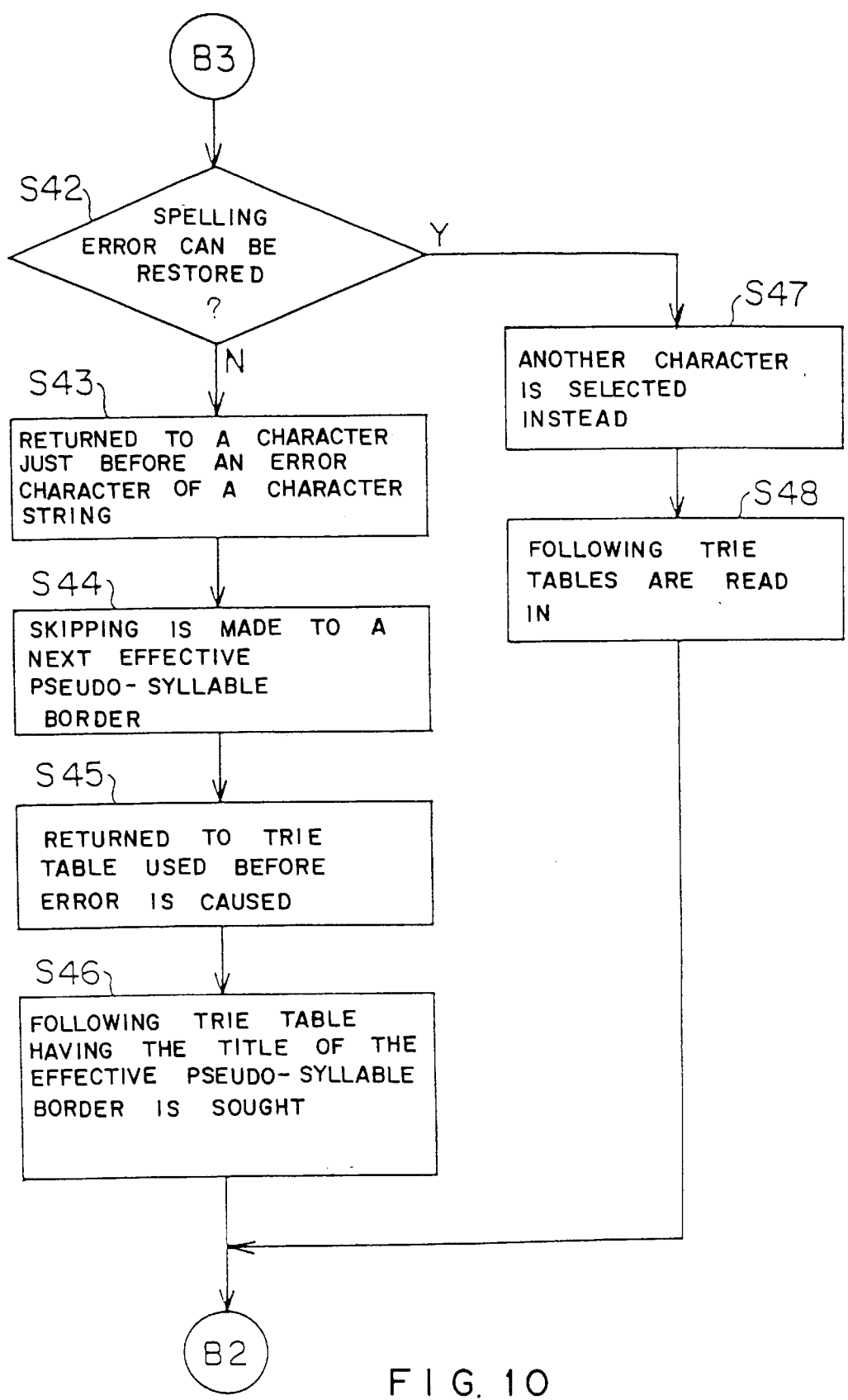

FIGS. 8 through 10 are flow charts showing the spelling error correcting process, which is an example of the character string correcting processes according to this embodiment of the present invention. FIGS. 11A through 17D show examples of the TRIE tables contained in the compiled dictionary 17. In FIGS. 11A through 17D, "V", "Adj" and "Adv" in a column of "corresponding words of the dictionary", represent verbs, adjectives and adverbs, and others in the column denote the same words as in FIGS. 1–2C. As seen in FIG. 2C, the TRIE table having no entry represents that any corresponding word having further characters cannot be found in the entries in the dictionary.

It will be described in this case how a character string "repretative of" inputted, is corrected by the processor 13. The character string "repretative of" is different from a correct character string "representative of", in that two characters "se" are missing, and it is assumed to have a serious error.

When the process is started in FIG. 8, the processor 13 reads in the TRIE table "root" shown in FIG. 1 (step S31), and then the first character of the input character string (step S32). In the case of "repretative of", the first character "r" is read in.

It is determined whether or not this read-in character is found in entries in the read-in TRIE table (step S33), and when the read-in character is found in entries in the TRIE table, a following TRIE table appointed by a TRIE table link which corresponds to the entry is read in (step S35). The character "r" is found in this case in entries in the TRIE table "root". A corresponding TRIE table "r-" is therefore read in (step S35).

The processor 13 then reads in the next character of the remaining characters in the input character string (step S32), and determines whether or not it is found in the entries in the TRIE table which has been read in at the step S35 (step S33). The second character "e" of characters of the input character string is read in this case (step S32), and a TRIE table "re-" appointed by a corresponding TRIE table link in the TRIE table "r-" is read in (step S35).

When the characters of the input character string are processed in order in this manner, a TRIE table "repre-" shown in FIG. 11B is read in, and when the next character "n" is read in, it can be determined that the character "n" is not found in the entries in the TRIE table "repre-" (step S33, NO).

It is therefore checked whether or not the character string read in till the character previous to "n" is found in entries in the dictionary (step S34). However, the corresponding word of the dictionary on a line of the input character "e" of the TRIE table "repr-" shown in FIG. 11A is empty (or is an empty set). It is therefore apparent that the character string "repre-" is not found in the entries in the dictionary (step S34, NO).

Accordingly, it is determined whether or not any spelling error has been made (FIG. 9, step S37). When an unexpected problem such as this is detected during the process, it is usually an extremely complicated problem to determine whether or not this is caused by a spelling error, and many determining methods can be conceived. Any of them can be employed by the present invention, but in the first determination conducted after a previously recognized word is outputted, it is assumed that a spelling error has been made (step S37, YES).

It is therefore determined whether or not the spelling error can be restored (FIG. 10, step S42). Various determining methods can also be conceived in this case, but due to the first determination, it is assumed that the error can be restored (step S42, YES).

Figure 3:
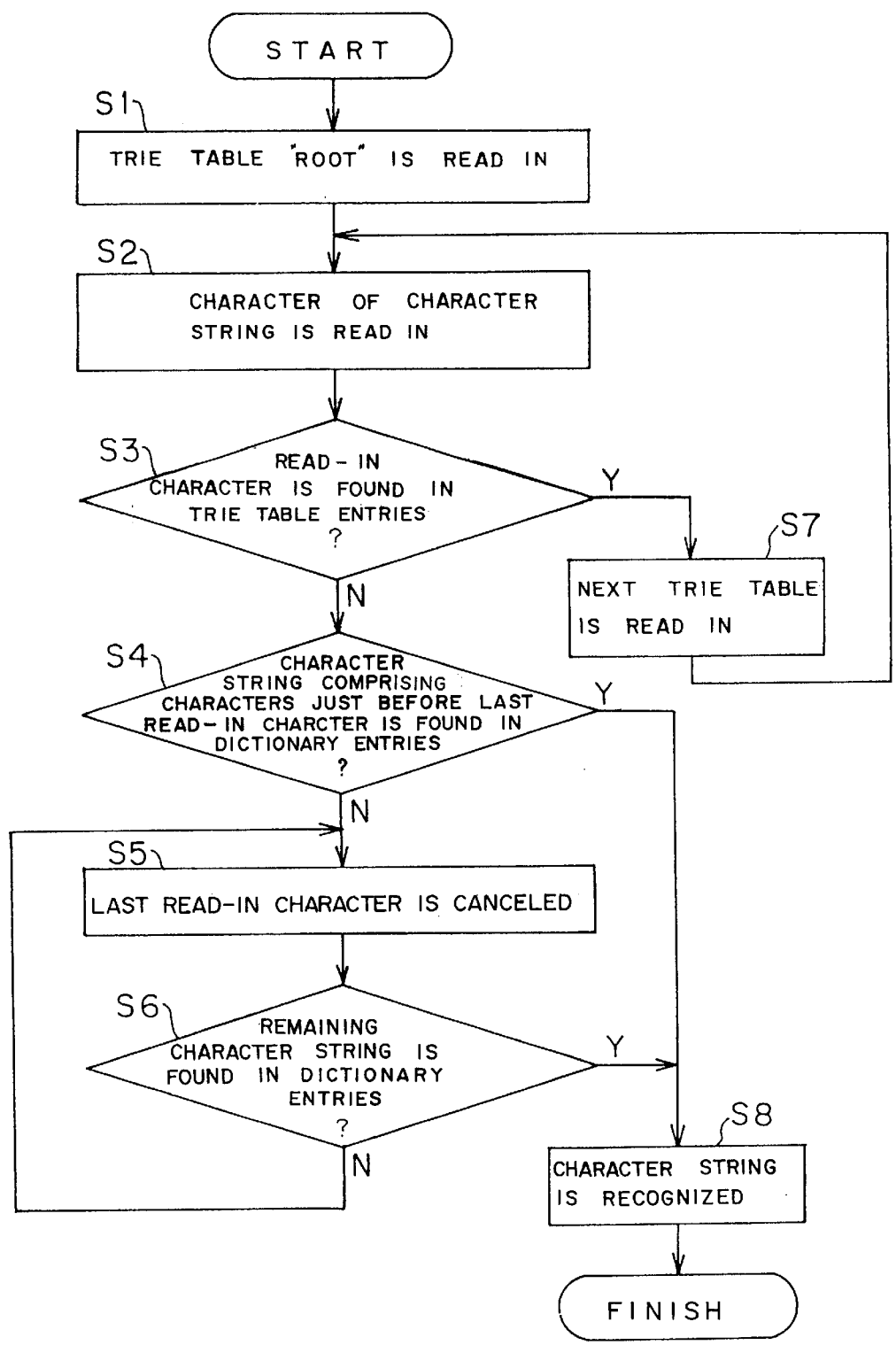
FIG. 3 is a flow chart showing a fundamental process of the TRIE method.
Figure 4:
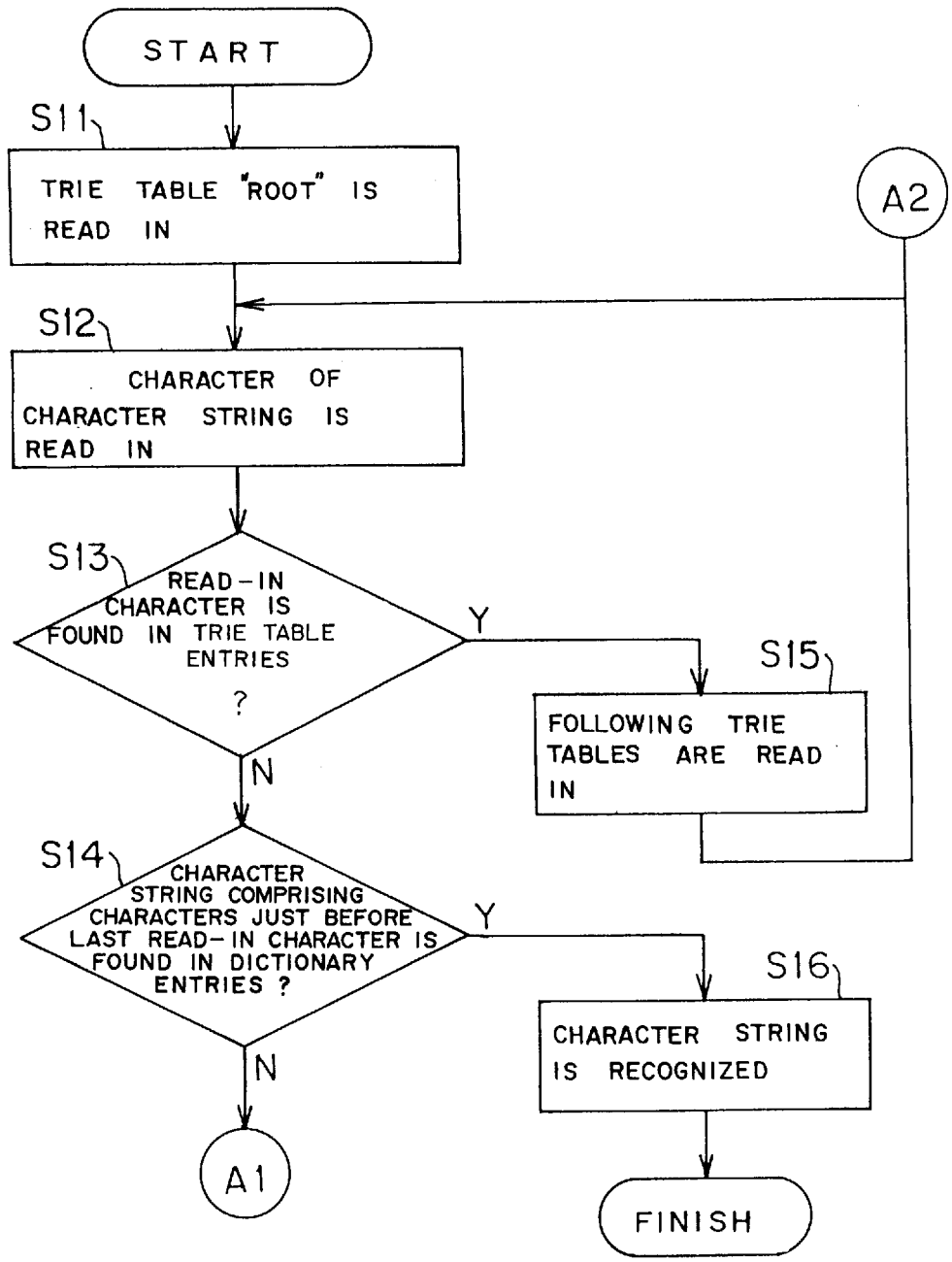
FIGS. 4 and 5 are flow charts showing a conventional spelling error correcting process.
Figure 5:
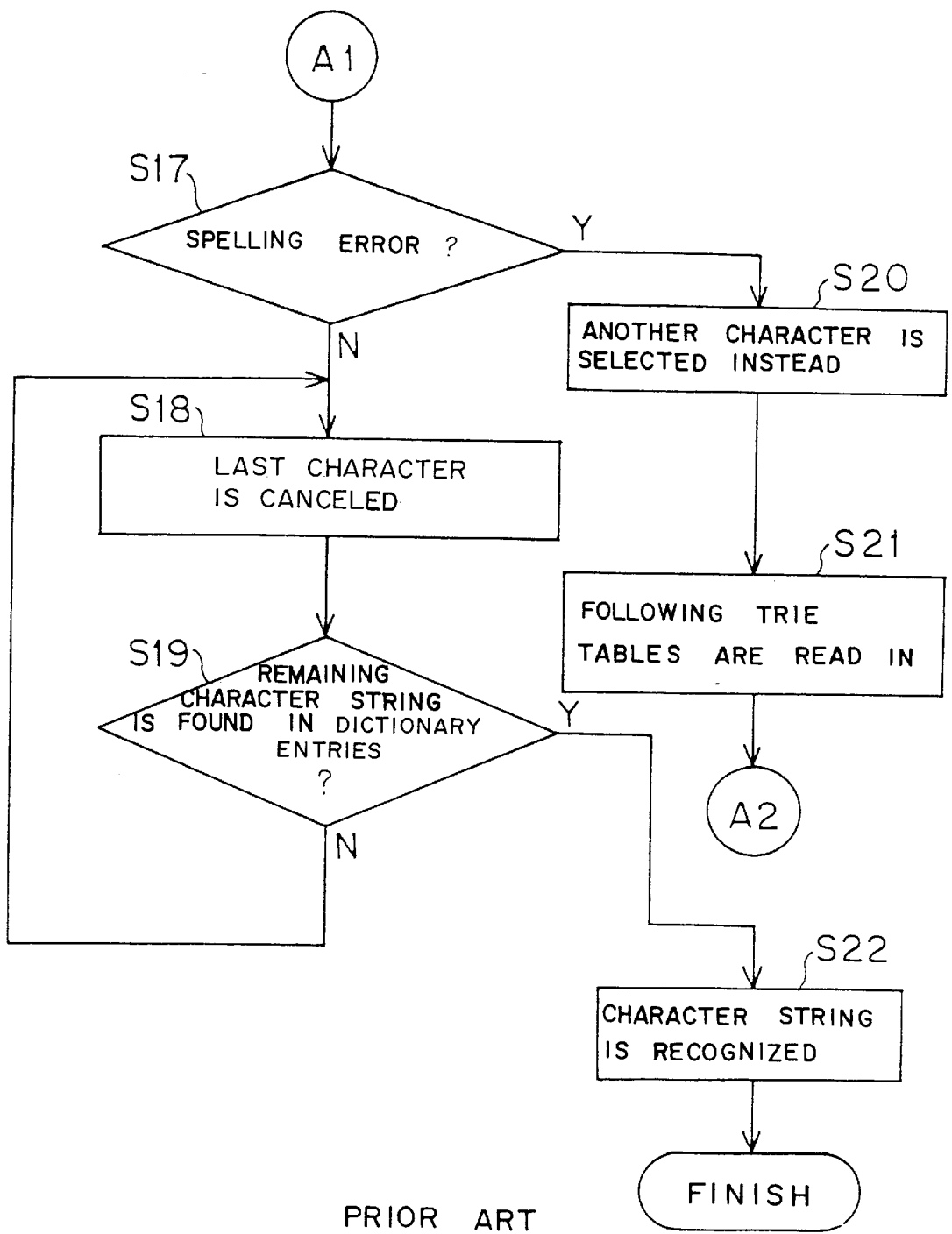

Providing that the spelling error can be restored, characters are instead selected from entries in the TRIE table (step S47), the following TRIE tables which correspond to the character selected are read in (step S48), and steps following the step S32 are repeated, as seen at the steps S20 and S21 in FIG. 5.

Two characters "h" and "s" of the TRIE table "repre-" are selected instead of the character "n" in this case (step S47), and a TRIE table "repreh-" shown in FIG. 11C and a TRIE table "repres-" shown in FIG. 11D are read in (step S48). However, the character "t" read in next is not found in entries in these TRIE tables (step S33, NO), and the character strings "repreh" and "repres" are not found in the entries in the dictionary (step S34, NO). Therefore, it is again determined to be a spelling error (step S37, YES), and steps following the step S42 are conducted.

The input character string still cannot be recognized as the result of assuming that: the spelling error can be restored. It is therefore determined that the error cannot be restored (step S42, NO), and the process advances to a pseudo-syllable mode which will be used following a step S43.

Under the pseudo-syllable mode, the processor 13 returns the read-in character string to the state it was in before the spelling error was detected (step S43). This process also returns a process pointer, which shows up to which character the character string has been processed, to a position on -the character string where the character string had been processed before the first spelling error was detected. The character string is returned to the state of "repre" in this case, and "native of" is regarded as a character string which is not yet processed.

The processor 13 skips to the border of the next effective pseudo-syllable (or pseudo-syllable border), while reading in the characters of the unprocessed character string one by one (step S44). Pseudo-syllables used by the present invention are different from those commonly-used, and their borders can be optionally defined by the system user. In this example, the position between a consonant and a vowel following it is defined to be the pseudo-syllable border.

Needless to say, the position between a vowel and a consonant following it may also be defined to be the pseudo-syllable border, or other definitions may be employed. The next effective pseudo-syllable border determined in step S44 does not necessarily coincide with a subsequent pseudo-syllable border. When the next effective pseudo-syllable border is at a region where an error is detected, it is not regarded as the effective pseudo-syllable border, but the subsequent pseudo-syllable border is employed.

The next pseudo-syllable border of the unprocessed character string "native of" is between "t" and "a", and it is behind the position of "n" where the error is detected. It is therefore regarded as being effective and the process pointer moves to this position (step S44).

The TRIE table which was used when the spelling error was first detected is then fetched (step S45) and, from a plurality of TRIE tables appointed by the fetched TRIE table, a TRIE table having effective pseudo-syllable borders as its title is selected (step 46). This selected TRIE table is not necessarily the next table but it is often still a low-ranking one. Some interposing TRIE tables are therefore skipped before the TRIE table having the effective pseudo-syllable borders as its title is selected.

In this example, a list of the next pseudo-syllable borders is previously stored in each TRIE table when the dictionary is compiled, as shown in FIGS. 11A through 17D. In the TRIE table "repre-" shown in FIG. 11B, for example, "repreh-", "repres-" and "repress-" are registered as the next pseudo-syllable borders.

In another embodiment of the present invention, these pseudo-syllable borders are obtained from the TRIE table when needed at the time of retrieval. The process of obtaining the next pseudo-syllable borders from the TRIE tables is the same as that when the dictionary is compiled. It will be described later in detail.

It is determined that first two characters of the character string "ntative of" include an error, and those pseudo-syllable borders which correspond to the position between these two characters are not effective. "repreh-" and "repres-" of the pseudo-syllable borders in the TRIE table "repre-" are also at the error-included position. They are thus skipped.

"reprehens-", "reprehend-" and "represent-" in pseudo-syllable border lists in the TRIE tables "repreh-" and "repres-" are selected along with "repress-" as effective pseudo-syllable borders. TRIE tables "reprehens-""reprehend-", "repress-" and "represent-" shown in FIGS. 12A, 12B, 12C and 12D are read in (step S46).

As described above, the effective pseudo-syllable borders are usually plural, and the TRIE tables which the processor 13 must process become plural, too. When input characters and TRIE tables which are targets to be processed are determined in this manner, the processor 13 repeats steps following the step S32.

A first character "a" of the remaining character string "ative of" is read in (step S32), and it is checked whether or not the character "a" is found in the entries of TRIE tables "reprehens-", "reprehend-", "repress-" and "represent-" (step S33). As the result, it is understood that the input character "a" is found only in the TRIE table "represent-" (step S33, YES), and a TRIE table "represents-" appointed by a TRIE table link "represents-" is read in (step S35).

Although "repress-" has been selected as an effective pseudo-syllable border at the step S46, this pseudo-syllable border "repress-" is adjacent to the error region (or the first two characters of the character string "ntative of"). It is therefore assumed to be inappropriate. "repressibl", "repression-" and "repressiv" are selected instead, as effective pseudo-syllable borders, in this case from the pseudo-syllable border list in the TRIE table "repress-" (step S46), and a corresponding TRIE table is retrieved (steps S32 and S33). As the result, it is also determined that the input character "a" is found only in the TRIE table "represent-" (step S33, YES), and the TRIE table "representa-" is read in (step S35).

The process then returns to a usual process mode (FIG. 8, steps S32, S33 and S35), and "representative of" which are entries of the dictionary are finally outputted as recognized words (step S36).

According to the present invention, a part of the input character string can be skipped along with a part of the TRIE table, as described above, thereby enabling the input character string to be automatically corrected to reach the correct TRIE table.

In flow charts shown in FIGS. 8 through 10, a plurality of TRIE tables which correspond to a plurality of candidates are read in and processed in parallel when a spelling error is detected. However, they may be successively processed one by one. When a character string cannot be recognized from a TRIE table in this case, the next TRIE table is processed, and when the character string can be recognized, the process is finished.

It will now be described how a spelling error is corrected when a character string of "repretantative of", which is a wrong expression of "representative of", is inputted. The character string "repretantative of" has two error characters "ta", and this is also another example of a serious spelling error. The process can also advance without any difficulty in this case until the TRIE table "repre-" is read in.

When an input character "t" is read in (step S32), it is understood that "t" is not found in entries in the TRIE table "repre-" (step S33, NO). As seen in the case of "repretative of", the restoring of the spelling error is also tried but it is determined to be impossible (step S42, NO). Accordingly the process advances to the pseudo-syllable mode.

The process pointer is returned to a position between "repre" and "tentative" (step S43), and then set at a position between "repretant" and "ative of" in this case (step S44). This is because the next pseudo-syllable border of "repre" which is at a position between "repret" and "antative" is not regarded as being effective, for it belongs to a region where the error was detected, and because skipping is made to behind "repretant" which is a subsequent pseudo-syllable border.

Similarly to the case of "repretative of", TRIE tables "reprehens-", "reprehend-" and "represent-" , which have effective pseudo-syllable borders, are obtained from the TRIE table "repre-" when the spelling error is detected (step S46). The next input character "a" is read in (step S32), its corresponding TRIE table "representa-" is read in (step S35), the process returns to the usual process mode, and the character string "representative of" which is an entry in the dictionary, is outputted as recognized words (step S36).

When an input character string cannot be recognized even when the process is conducted under the pseudo-syllable mode (step S34, NO), it is determined not to be a spelling error (step S37, NO), characters of the character string are canceled from the last to the first one by one (steps S38 and S39), and it is checked whether or not the string of characters still remaining coincides with any of entries in the dictionary (step S40). If they coincide with each other (step S40, YES), the character string is outputted as a recognized word (step S41) and the process is finished. When all characters of the character string are canceled (step S39, NO), the analysis ends in failure.

Referring to the TRIE tables shown in FIGS. 13A through 17D, in a case where the correction of a character string is vague or a plurality of interpretations are found relative to a character string, will now be described. The character string correcting system and method according to the present invention makes it possible to limit the numbers of candidates of a recognized word to be as small as possible, even in this case.

When "fasjoonable" is inputted as a character string, for example, a TRIE table "fas-" shown in FIG.13B is read in according to the flow charts shown in FIGS. 8 through 10, and the process is performed under the usual process mode until the string of characters still remaining becomes "joonable" (step S35).

When the character "j" is then read in (step S32), it is understood that the character "j" is not found in entries of the TRIE table "fas-" (step S33, NO). Further, the column of words in the dictionary which correspond to a character "s" of a TRIE table "fa-" is empty. The character string "fas" is also not found in the entries of the dictionary (step S34, NO).

It is therefore assumed that a spelling error is detected (step S37, YES), and that the spelling error can be restored (step S42, YES). Three characters "c", "h" and "t" are taken, instead of "j", out of the entries in the TRIE table "fas-", according to the usual spelling error process (step S47), and their corresponding TRIE tables "fasc-", "fash-" and "fast-" shown in FIGS. 13C, 15D and 16A are read in (step S48).

However, the next input character "o" is not found in any of the entries of these tables (step S33, NO). Therefore, the spelling error cannot be restored and the process advances to the pseudo-syllable mode (step S42, NO).

The process pointer is returned to a position between "fas" and "joonable" (step S43), and then set at a position between "fasjoon" and "able", which is the next effective pseudo-syllable border (step S44).

The TRIE table "fas-" prior to the spelling error is fetched (step S45), and pseudo-syllable borders "fasc-", "fash-", "fast-" and "fastn-" stored in the TRIE table are checked. However, these pseudo-syllable borders are at a region where the error has been detected, and accordingly they have little reliability. Next pseudo-syllable borders are therefore further retrieved in the corresponding TRIE tables "fasc-", "fash-", "fast-" and "fastn-" . The TRIE table "fastn-" is shown in FIG. 17A.

"fasces-", "fasciat-", "fascic-", "fascicl-", "fascin-", "fascism-", "fascist-", "fashion-", "fasten-", "fastid-", "fasting-", "fastish-" and "fastness-" are employed as effective pseudo-syllable borders, and TRIE tables "fasces-", "fasciat-", "fascic-", "fascidl-", "fascin-", "fascism-", "fascist-", "fashion-", "fasten-", "fastid-", "fasting-", "fastish-" and "fastness-" shown in FIGS. 14A, 14B, 14C, 14D, 14E, 15A, 15B, 15E, 16B, 16C, 16D, 16E and 17B are obtained (step S46).

The process is then returned to the usual process mode, a next input character "a" is read in (step S32), and it is determined that the character "a" is found only in the entries in TRIE tables "fascin-", "fashion-" and "fasten-" (step S33, YES). The corresponding TRIE tables "fascina-", "fashiona-" and "fastena-" shown in FIGS. 15C, 17C and 17D are read in (step S35), and it is then checked whether or not the next input character "b" is registered as an entry in these TRIE tables (step S33).

The character "b" is not found in the entries of the TRIE table "fascina-". Therefore, the TRIE table "fascina-" is canceled from retrieval. TRIE tables "fashionab-" and "fastenab-" which correspond to an entry "b" of the two remaining TRIE tables "fashiona-" and "fastena-" are retrieved, and "fashionable" and "fastenable" are finally outputted as recognized words (step S36).

The candidates for entries of the dictionary which correspond to the vague input character string "fasjoonable", are limited to "fashionable" and "fastenable" in this manner. The character string "fasjoonable" is also an example of a serious error.

At the step S33 shown in FIG. 8, it cannot be said that a character read in is an actual spelling error, when the character does not coincide with any of the entries in a TRIE table. When a word "work" is wrongly spelled like "wirk", for example, the first character which does not coincide with any of the entries in the TRIE table is not "i" but "k". "work" is registered together with "wire" in the dictionary. Therefore, the character string "wir" of the word "wirk" coincides with entries in the TRIE table. A determination algorithm which deals with this problem can be used at the step S37.

Figure 18:
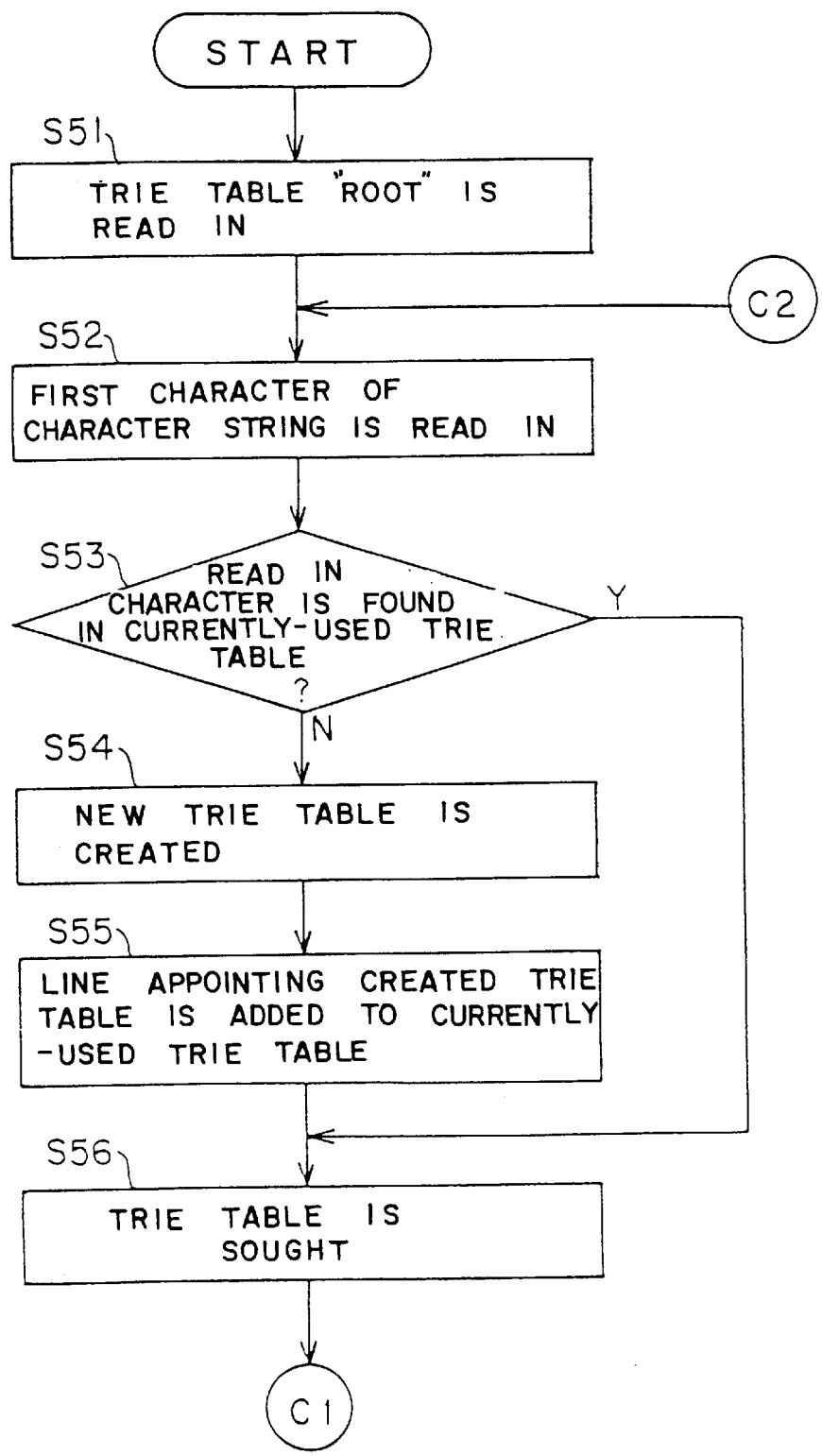

Referring to FIGS. 18 through 20, it will be described how the dictionary is compiled by the processor 13. A dictionary compiling process shown in flow charts in FIGS. 18 and 19 includes determining pseudo-syllable borders, and storing the pseudo-syllable borders thus determined in TRIE tables.

A verb "cater" which is an entry of the dictionary 16 is compiled, and TRIE tables are added to the compiled dictionary 17 in this case. It is assumed that a noun "cat" has already been stored in the compiled dictionary 17.

When the process shown in FIG. 18 is started, the processor 13 reads in a TRIE table "root" stored in the main memory 11 (step S51), and also reads in the first character of the input character string (step S52). The first character "c" of the character string "cater" is read in, in this case.

It is then determined whether or not the read-in character is found in the entries in the currently-used TRIE table (step S53), and when it is found in entries in the TRIE table, its corresponding TRIE table link is obtained (step S56). The character "c" is found in entries in the TRIE table "root" (step S53, YES), and its corresponding TRIE table link "c-" is therefore obtained (step S56).

It is then checked whether or not input characters still remain (step S57). When they are found, the currently-used TRIE table is stored in the temporary memory 12 (step S59), and a TRIE table which is appointed by the TRIE table link obtained at the step S56 is read in (step S60). The TRIE table "root" is stored at this time in the temporary memory 12 (step S59) and the next TRIE table "c-" is read in (step S60), thereby creating a new and currently-used TRIE table.

It is then checked whether or not the current or present position in the character string corresponds to a pseudo-syllable border (step S61). As described above, the pseudo-syllable border can be optionally defined. In this case, therefore, it is defined as follows: When a left character adjacent to a position is not the first character but is a consonant, and a right character adjacent to the position is a vowel, or when a left character adjacent to the position is a last character, and there is no right character adjacent to this position, the position is regarded as a pseudo-syllable border. In order to determine whether or not the position corresponds to this pseudo-syllable border, it is necessary to check the next input character which is the one to the right adjacent to this position.

When the position does not correspond to a pseudo-syllable border, it is checked whether or not input characters still remain (step S64), and when they are found to remain, steps following the step S52 are repeated. The left character "c" adjacent to this position is the first of the input character string in this case. Therefore, the position does not correspond to a pseudo-syllable border (step S61, NO), and the first character "a" of the remaining character string is read in (step S52).

The character "a" is found in the entries in the currently-used TRIE table "c-" (step S53, YES), and its corresponding TRIE table link "ca-" is thus obtained (step S56). Because input characters still remain (step S57, YES), the TRIE table "c-" is stored in the temporary memory 12 (step S59), and a next TRIE table "ca-" is read in (step S60).

The present position is between the vowel "a" and a consonant "t", and it does not correspond to a pseudo-syllable border (step S61, NO). The next character "t" is therefore read in (step S52).

The character "t" is found in the entries in the currently-used TRIE table "ca-" (step S53, YES), and its corresponding TRIE table link "cat-" is thus obtained (step S56). Because input characters still remain (step S57, YES), the TRIE table "ca-" is stored in the temporary memory 12 (step S59), and a next TRIE table "cat-" is read in (step S60).

The present position corresponds to a pseudo-syllable border at this time (step S61, YES). Therefore, the processor 13 adds the title of currently-used TRIE table to the pseudo-syllable border lists of all TRIE tables stored in the temporary memory 12 (step S62). All TRIE tables in the temporary memory 12 are written together with the updated pseudo-syllable border lists into the main memory 11 to leave the temporary memory 12 empty (step S63), and steps following the step S64 are conducted.

Three TRIE tables "root", "c-" and "Ca-" are stored in the temporary memory 12 at this stage. However, the character "t" read in last corresponds to the last character of the word "cat", which has been compiled, and the present position corresponds to a pseudo-syllable border of the word "cat". Therefore, the title "cat-" of the currently-used TRIE table has been registered in each of the pseudo-syllable border lists of the above-mentioned three TRIE tables, thereby making it unnecessary to again add this title to them. These three TRIE tables are thus returned to the main memory 11 (step S63).

The next input character "e" is read in (step S52), but it is understood that the character "e" is not found in the entries of the currently-used TRIE table "cat-" (step S53, NO), because words each having more characters than the word "cat" are not yet compiled.

The processor 13 therefore newly creates in the main memory 11 a TRIE table having a title which is formed by adding the read-in character to the title of the currently-used TRIE table (step S54). A line having a TRIE table link by which the newly created TRIE table is appointed, is added to the currently-used TRIE table (step S55), and steps following the step S56 are conducted.

In short, a new TRIE table "cate-" is created (step S54), and a line comprising the input character "e", the corresponding word "O" of the dictionary, and the TRIE table link "cate-", is added to the currently-used TRIE table "cat-" (step S55).

Using the line thus added, a TRIE table link "cate-", which corresponds to the entry "e" of the input characters in the currently-used TRIE table "cate-", is obtained (step S56). Input characters still remain (step S57, YES), therefore the TRIE table "cat-" is stored in the temporary memory 12 (step S59), and a next TRIE table "cate-" is read in (step S60).

The present position does not correspond to a pseudo-syllable border (step S61, NO). Therefore, the next character "r" is read in (step S52). However, the currently-used TRIE table "cate-" has just been created and has no entry. Accordingly the character "r" is not found in the TRIE table "cate-" (step S53, NO).

A new TRIE table "cater-" is thus created (step S54), and a line comprising the input character "r", the corresponding word "φ" of the dictionary, and a TRIE table link "cater-", are added to the currently-used TRIE table "cate-" (step S55). Using the entry on the line thus added, a TRIE table link "cater-" is obtained (step S56).

No input character remains at this time (step S57, NO). The processor 13 therefore sets an appropriate identifier as an entry of the corresponding word in the dictionary on the line added at the step S55 (step S58), and performs steps following the step S59. A part of speech, for example, to which the entry of the dictionary belongs, is used as the identifier in this case, but any other information needed may be used as the identifier.

"V" representing a part of speech to which the word "cater" belongs is written, as the corresponding word of dictionary (corresponding dictionary word), into the line of the input character "r" of the currently-used TRIE table "cate-", and "φ" set at the step S54 is erased (step S58). The updated TRIE table "cate-" is stored in the temporary memory 12 (step S59), and a next TRIE table "cater-" is read in (step S60).

The left character "r" adjacent to the present position is the last of the input character string, and the present position is therefore determined to again correspond to a pseudo-syllable border (step S61, YES). The title "cater-" of the currently-used TRIE table is not registered this time, as a pseudo-syllable border, in any of the two TRIE tables "cat-" and "cate-" stored in the temporary memory 12. Therefore, "cater-" is added to pseudo-syllable border lists of these TRIE tables (step S60).

The TRIE tables "cat-" and "cate-" are written back into the main memory 11, and the temporary memory 12 is thus made empty again (step S63). No input characters remain at this time (step S64, NO). The process is finished accordingly. An entry "cater" in the dictionary is added to the TRIE table in this manner.

According to this embodiment of the present invention, the pseudo-syllable border can be previously determined and registered in the TRIE table when a dictionary is to be compiled, but according to another embodiment, the pseudo-syllable border can be obtained in the same manner only when needed during the spelling error correcting process. It is not necessary in this case that the pseudo-syllable border is previously determined for all entries in the dictionary, thereby enabling the process to be made simpler.

Although the input character string has been English in the above-described embodiments, the present invention is not limited to a specific language, but it can be applied to character and symbol strings of all languages including Japanese, Chinese, German, Dutch and so on. Further, it is not necessary that input character strings belong to a single language, but character strings including a plurality of languages which have been registered in the dictionary, can also be processed by the present invention.

Furthermore, the input of character strings may be made in any form. Therefore, character strings inputted by voice, for example, can also be processed by the character string correcting system of the present invention.

According to the present invention, error correcting of character strings in the morphological analysis can be made simpler, and the time needed for this process can be made shorter. Particularly when the character string includes serious errors such as a plurality of wrong or unnecessary characters, which can be more quickly corrected by a more consistent and simpler process.

What is claimed is:

1. A character string correcting system suitable for use with an information process apparatus to conduct morphological analysis while comparing an input character string with entries in a dictionary, said system comprising:

dictionary storing means for storing a dictionary having entries for input characters for comparison with characters of the input character string, and for storing an appropriate position in each entry of the dictionary as a pseudo-syllable border;

retrieving means for retrieving the dictionary stored in said dictionary storing means so as to retrieve an entry of the dictionary corresponding to the input character string, and to output a recognized word resulting from the retrieval; and skipping means for, when a character of the input string does not coincide with an entry for input characters, skipping a part of the dictionary as well as a part of the input character string to locate a position at which a character of the input character string coincides with an entry for input characters thereby causing said retrieving means to start from the position in the input character string, said skipping means skipping to the pseudo-syllable border of the dictionary when a character of the input character string does not coincide with any of the entries for input characters.

2. The character string correcting system according to claim 1, wherein said dictionary storing means stores the dictionary which has a plurality of TRIE tables to enable input characters to be successively retrieved one by one; each TRIE table has entries each representing a candidate for a next character of the input character string, entries each denoting a corresponding word of the dictionary for each input character, and TRIE table links each for appointing a next TRIE table, when the retrieval advances from a first character to other characters of the input character string; said retrieving means retrieves said plurality of TRIE tables to retrieve the recognized word; and said skipping means skips to a TRIE table whose entry coincides with the character of the input character string, when they do not coincide with each other on any of the other TRIE tables.

3. The character string correcting system according to claim 1, wherein said retrieving means retrieves those characters of the input character string which follow the pseudo-syllable border.

4. The character string correcting system according to claim 3, wherein the pseudo-syllable border is set at a position between a consonant and a vowel which follows the consonant.

5. The character string correcting system according to claim 1, wherein said skipping means seeks, as a pseudo-syllable border, an appropriate position in each entry of the dictionary when a character of the input character string does not coincide with any of the entries for input characters, and said retrieving means retrieves those characters of the input character string which follow the pseudo-syllable border.

6. The character string correcting system according to claim 5, wherein said pseudo-syllable border is set at a position between a consonant and a vowel which follows the consonant.

7. The character string correcting system according to claim 1, wherein said skipping means skips a part of the dictionary as well as a part of the input character string to seek a position at which a character of the input character string coincides with one of the entries for input characters, when the input character string cannot be recognized even if the character of the input character string which does not coincide with any of the entries for input characters is replaced by one of the entries for input characters.

8. A character string correcting method suitable for use with an information process apparatus for conducting morphological analysis while comparing and input character string with entries of a dictionary, said method comprising the steps of:

creating a dictionary which has entries for input characters for comparison with characters of the input character string;

determining an appropriate position in an entry of the dictionary as a pseudo-syllable border;

retrieving the created dictionary to seek an entry for input characters which coincides with a character of the input character string;

when a character of the character string does not coincide with one of the entries for input characters skipping a part of the dictionary as well as a part of the input character string to seek a position in the input character string at which a character of the character string coincides with one of the entries for input characters;

skipping to an effective pseudo-syllable border in the input character string;

conducting the retrieval from the position to seek an entry of the dictionary which corresponds to the input character string; and outputting the entry of said dictionary as a recognized word which results from the retrieval.

9. The character string correcting method according to claim 8, comprising the steps of, at the time the dictionary is to be created, reading in the characters of an entry of said dictionary one by one, creating a TRIE table which corresponds to a character string consisting of a first character of said entry and subsequent read-in characters, storing in the TRIE table entries each representing a candidate for a next character, entries each denoting a corresponding word of the dictionary for each input character, and TRIE table links each for appointing a next TRIE table, and further comprising the step of, at the time the dictionary is to be retrieved, skipping to a TRIE table whose entry coincides with a character of the input character string, when the character does not coincide with any of the entries in the other TRIE tables.

10. The character string correcting method according to claim 9, further comprising the steps of:

at the time the dictionary is to be created determining an appropriate position in an entry of the dictionary as a pseudo-syllable border, and adding the pseudo-syllable boarder to the TRIE tables, which have been provided prior to the currently-used TRIE table, when the read-in character corresponds to the pseudo-syllable border; and at the time the dictionary is to be retrieved:

skipping to a TRIE table which corresponds to a character string consisting of a first character of the input character string and subsequent characters which follow the first one, and which ends with the pseudo-syllable border, when a character of the input character string does not coincide with any of the entries in the TRIE tables further skipping to an effective pseudo-syllable border in the input character string; and retrieving those characters of the input character string which follow the effective pseudo-syllable border.

11. The character string correcting method according to claim 9, comprising the steps of, at the time the dictionary is to be retrieved, locating a pseudo-syllable border at an appropriate position in an entry of the dictionary, when a character of the input character string does not coincide with any of the entries in the dictionary, skipping to a TRIE table which corresponds to a character string consisting of a first character of the input character string and subsequent characters thereof which follow the first one and which end with the pseudo-syllable border, when a character of the input character string does not coincide with any of the entries in the currently-used TRIE table, also skipping to an effective pseudo-syllable border in the input character string, and retrieving those characters of the input character string which follow the effective pseudo-syllable border.

12. The character string correcting method according to claim 8, comprising the step of skipping a part of the dictionary as well as a part of the input character string to locate a position at which a character of the input character string coincides with any of the entries for input characters, when the input character string cannot be recognized even if the character of the input character string which does not coincide with any of the entries for input characters is replaced by one of those entries.

* * * * *